United States Patent [19]

Spitzer et al.

[11] 3,912,667

[45] *Oct. 14, 1975

[54] STRUCTURES SUCH AS APPLICATOR PADS FOR CLEANING AND OTHER PURPOSES, PROPELLANT COMPOSITIONS FOR FORMING THE SAME AND PROCESS

[76] Inventors: Joseph George Spitzer, 722 Cone Road East, Mamaroneck, N.J. 10543; Marvin Small, 1100 Park Ave., New York, N.Y. 10028; Lloyd I. Osipow, 2 Fifth Ave., New York, N.Y. 10011; Dorothea C. Marra, 107 Fernwood Road, Summit, N.J. 07901

[ * ] Notice: The portion of the term of this patent subsequent to Oct. 14, 1992, has been disclaimed.

[22] Filed: May 17, 1974

[21] Appl. No.: 469,718

Related U.S. Application Data

[63] Continuation of Ser. No. 180,170, Sept. 13, 1971, abandoned, which is a continuation-in-part of Ser. Nos. 797,257, Feb. 6, 1969, abandoned, and Ser. No. 5,150, Jan. 22, 1970, abandoned, and Ser. No. 166,960, July 28, 1971.

[52] U.S. Cl............... 260/2.5 E; 52/298; 106/122; 106/170; 128/260; 128/272; 132/87.7; 132/DIG. 3; 260/2.5 L; 260/2.5 AF; 260/2.5 AK; 260/2.5 HA; 260/2.5 N; 260/9 R; 260/13; 260/17 R; 260/17.4 BB; 260/17.4 R; 260/17.4 ST; 260/18 TN; 260/18 S; 260/22 R; 260/23 H; 260/23 S; 260/23 R; 260/23 P; 260/28.5 R; 260/29.2 M; 260/29.2 TN; 260/29.6 H; 260/29.6 ME; 260/29.6 MH; 260/29.6 MN; 29.6 MQ/; 260/29.6 MP; 260/29.6 T; 260/29.6 X A; 260/29.7 GP; 260/29.7 R; 260/30.6 R; 260/31.8 DR; 260/31.8 H; 260/31.8 PH; 260/31.8 R; 260/31.8 S; 260/31.8 XA; 260/33.6 PQ; 260/33.6 R; 260/33.6 SB; 260/33.6 UA; 260/33.6 UR; 260/33.8 R; 260/33.8 SB; 260/33.8 UA; 260/33.8 UB; 260/37 SB; 260/37 N; 260/40 R; 260/42.37; 260/42.52; 260/33.4 PQ; 260/33.4 R; 260/33.4 SB; 260/33.4 NR; 260/897 R; 264/53

[51] Int. Cl.$^2$....... C08J 9/12; C08J 9/26; C08J 9/30
[58] Field of Search................ 260/2.5 L, 29.6 BM; 106/170, 122

[56] References Cited

UNITED STATES PATENTS

| | | | |
|---|---|---|---|
| 2,777,824 | 1/1957 | Leeds............................... | 260/2.5 M |
| 3,378,507 | 4/1968 | Sargent et al.................. | 260/2.5 M |
| 3,419,506 | 12/1968 | Gauder............................ | 260/2.5 E |
| 3,663,470 | 5/1972 | Nishimura et al.............. | 260/2.5 M |
| 3,682,848 | 8/1972 | Virnelson........................ | 260/2.5 M |

*Primary Examiner*—Morton Foelak

[57] ABSTRACT

Structures such as applicator pads for cleaning and other purposes are provided, that are formed from propellant compositions including a synthetic resin in solution in a low boiling propellant. Such compositions quickly form foamed structures containing open and/or closed cells at atmospheric temperature and pressure. The structures and propellant compositions include material which is deposited in the pores and/or walls of the structure as the structure is formed, and which can be removed from the structure when desired. These structures are particularly suitable for use as applicator pads for materials such as cosmetics, pharmaceuticals, detergents, antimicrobial agents and abrasives.

A process also is provided for forming foamed structures from propellant compositions including a synthetic resin, controlling the proportion of open cells and/or closed cells.

The propellant compositions are stored in closed containers capable of withstanding an internal pressure sufficient to keep the propellant in the liquid phase at atmospheric temperature, and when the composition is withdrawn from the container to atmospheric pressure, the propellant volatilizes rapidly, and the foamed structure is formed within a few seconds.

37 Claims, No Drawings

STRUCTURES SUCH AS APPLICATOR PADS FOR CLEANING AND OTHER PURPOSES, PROPELLANT COMPOSITIONS FOR FORMING THE SAME AND PROCESS

This is a continuation of application Ser. No. 180,170, filed Sept. 13, 1971 now abandoned which in turn is a continuation-in-part of Ser. No. 797,257 filed Feb. 6, 1969 now abandoned, Ser. No. 5150 filed Jan. 22, 1970, now abandoned, and Ser. No. 166,960, filed July 28, 1971.

A propellant is defined by the Chemical Specialties Manufacturers' Association as a liquefied gas with a vapor pressure greater than atmospheric pressure at a temperature of 105°F. A large class of organic compounds falls in this category, of which some are hydrocarbons, but most are halogenated hydrocarbons having one or two carbon atoms, and one or more chlorine, fluorine or bromine atoms. Frequently different halogens are substituted in the same molecule to impart the desired vapor pressure.

Because of their high volatility propellants have been used as pore-forming agents in the production of plastic forms for many years. Propellants are soluble in many synthetic resins, and accordingly can be absorbed in the solid resin, which is desirably in particulate form, after which the resin containing the absorbed propellant is subjected to heat and pressure. The propellant vaporizes, and a closed cell foam structure is formed. U.S. Pat. No. 3,335,101 shows application of this process to the production of foams of chlorinated polyethylene. U.S. Pat. Nos. 2,387,730, 2,948,665, and 3,351,569 foam polyethylene and polypropylene in this way, U.S. Pat. No. 3,160,688 foams polystyrene, U.S. Pat. No. 3,352,802 foams polyvinyl chloride, U.S. Pat. No. 3,253,967 foams polyoxymethylene, and U.S. Pat. No. 3,305,497 foams polyurethanes. U.S. Pat. No. 3,310,617 foams a variety of thermoplastic resins by a similar but modified process intended to ensure that the propellant is uniformly dissolved or dispersed in the molten resin, so as to overcome the poor mixing problems of prior procedures.

In these procedures the amounts of propellants used are rather small, because only small amounts of the propellant can be absorbed in the solid resin, and the resin is molten, to facilitate foaming of the structure when the propellant is volatilized in situ to form the cells. The resin is then allowed to solidify before the structure can collapse, so as to preserve the foamed nature.

Randa, U.S. Pat. No. 3,072,583, patented Jan. 8, 1963, prepares foamed articles by extruding a perfluorocarbon resin in molten form, and containing from 0.1 to 5% by weight of a fluoromethane. The fluoromethane dissolves in the resin at atmospheric pressure and room temperature, and is volatilized under the extrusion conditions nso as to produce a foamed structure. This procedure is useful for coating wire with a foamed coating.

Raley and Skochdopole, U.S. Pat. No. 3,379,802, patented Apr. 23, 1968, describe a similar procedure for aliphatic olefin polymer blends, and U.S. Pat. No. 3,067,147 makes cellular polyethylene using 1,2-dichloro-1,1,2,2-tetrafluoroethane.

It has also been proposed that ultramicrocellular fibers be prepared with the aid of propellants. Blades and White, U.S. Pat. Nos. 3,227,664 and 3,227,784, patented Jan. 4, 1966, describe a flash extrusion process for this purpose. Supple, ultramicrocellular shaped structures are obtained from synthetic organic crystalline polymers by heating a confined mixture of the polymer plus at least one activating liquid at a temperature and pressure at which a homogeneous solution is formed, the temperature being greater than the normal boiling point of the liquid. This solution is then extruded abruptly to a region of substantially lower pressure and temperature under such conditions that a very large number of bubble nuclei exist at the extrusion orifice. Vaporization of the activating liquid rapidly cools the solution to the temperature at which the polymer precipitates and freezes in the polymer orientation produced in the rapid extrusion and expansion process.

The activating liquids must meet a number of requirements, of which one of the most noteworthy is that the liquid should dissolve less than 1% of the polymeric material at or below its boiling point. In other words, it is a non-solvent for the polymer at or below its boiling point, but a solvent for the polymer under the extrusion conditions. To provide bubble nuclei at the instant of extrusion, a particulate solid nucleating agent can be incorporated in the polymer solution. Silica aerogel is a suitable nucleating agent. The result is a structure having extremely small closed cells. Modifications of this process are described in U.S. Pat. No. 3,081,519 to Blades, et al., dated Mar. 19, 1963, Nos. 3,375,211 and 3,384,531 to Parrish, dated Mar. 26, 1968 and May 21, 1968, No. 3,375,212 to Bonner, issued Mar. 26, 1968, No. 3,461,193 to Gilardi, dated Aug. 12, 1969, and No. 3,467,744 to Woodell, dated Sept. 16, 1969.

Certain synthetic resins are soluble in propellants at room temperature. Bunting, U.S. Pat. No. 2,716,637, patented Aug. 30, 1955, pointed out that when such solutions are volatilized quickly, fine bubbles of plastic resin are obtained, which initially retain sufficient solvent so as to possess a surface tackiness, but as the solvent continues to escape from the globules, they blister and acquire an unsatisfactory appearance. Bunting avoids this by combining a fatty acid with the resin propellant solution, and keeps the resin content of the solution rather low, within the range from 5 to about 12%. Similar compositions are described by Hochberg and Pellerano, U.S. Pat. No. 2,773,855, patented Dec. 11, 1956, and these workers point out that the particles obtained are in the form of small, hollow or solid semispheres ranging from 1/16 or ¼ inch in largest dimension. Coherent foamed masses are not obtained.

Gander, U.S. Pat. No. 3,419,506, patented Dec. 31, 1968, prepares a protective film covering or dressing for wounds by dispensing from a pressurized container a composition comprising a film-forming vinyl acetate polymer or alkyl acrylate polymer, from 10 to 50% by weight based on the solids of a finely-divided filler, and a propellant, the solution having a viscosity of at least 1000 cp at normal room temperature. The inert filler must be present in order to obtain satisfactory foamed application of the film-forming resin, according to Gander, the filler perhaps serving as a nucleating agent, as described by Blades et al. in U.S. Pat. Nos. 3,227,784 and 3,227,664, and rather thin, tacky films are obtained, several mils in thickness.

In accordance with the instant invention, structures such as applicator pads are provided, that are formed from propellant compositions including a film-forming synthetic resin in solution in the propellant. Such compositions at atmospheric temperature and pressure form coherent, voluminous foamed structures, composed of a matrix of the synthetic resin, containing open or closed cells or both, in any desired proportion. The composition can include an additive which is deposited in the cells and/or walls (i.e., the resin matrix) of the structure when the propellant volatilizes, and may exude or bleed from the strauctute, or may be expressed therefrom or leached by water. Thus, the foamed structures of the invention have; utility as applicator pads for a variety of materials, such as antimicrobic agents including bactericidese and fungicides, cosmetics, detergents and other cleansing agents, antibiotics, astringents, and various types of medicaments.

The propellant compositions of the invention also are useful with or without the additive to form molded structures, which can be molded in open or closed molds under autogenous pressure at atmospheric temperature into a variety of shaped foamed structures.

The invention also provides a process for forming foamed structures from propellant compositions of this type, which makes it possible to control the relative proportions of open and closed cells in the resulting structure.

The propellant compositions in accordance with the invention comprise a film-forming synthetic polymer in an amount within the range from about 10 to about 60% by weight of the composition in solution in a liquid propellant boiling below 45°F. at atmospheric pressure and retained in the composition in the liquid phase at a superatmospheric pressure, the propellant being in a sufficient amount within the range from about 20 to about 70% by weight of the composition to form upon rapid volatilization of the propellant at atmospheric temperature and pressure a coherent, voluminous foamed structure containing open and/or closed cells; and dispersed or dissolved in the composition an additive in an amount within the range from about 5 to about 700% by weight of the polymer, in excess of the amount soluble in the polymer in the absence of the propellant, and which is deposited in the cells of the structure when the propellant volatilizes, and which can be removed from the cells of the structure, any organic liquid present which is a solvent for the polymer and boils at or above 45° F. at atmospheric pressure being in an amount from about zero up to about 3 times and preferably up to about twice the amount of polymer present in the composition.

The additive that may subsequently be disposed in the cells and/or walls of the foamed structure can be in solution in the propellant, or dispersed in the propellant, or in solution or in dispersion as a separate liquid phase that is itself dispersed in the propellant phase of the composition. As used herein, the term "additive in liquid form" means an additive which is a liquid or which is dissolved in or dispersed in a liquid so as to be in liquid form. The additive may also be the sole component of a separate liquid phase that is itself dispersed in the propellant phase of the composition. Thus, the propellant compositions of the invention can be solutions or emulsions in which the propellant is the solvent in the continuous phase and another liquid or liquid composition or solid which is the additive is dispersed therein in a discontinuous phase. Since the propellant boils at a temperature below 45°F., it is of course a vapor at room temperature and pressure. Consequently, the propellant compositions of the invention are stored in closed containers capable of withstanding the pressure of the propellant, so as to maintain the propellant in the liquid phase. When the composition is ejected from the container to atmospheric pressure at atmospheric (room) temperature, the propellant is rapidly volatilized, and a coherent foamed structure is formed, with the additive in the cells and/or walls.

It has been determined in accordance with the invention that the relative proportions of open and closed cells in the foamed structures of the invention can be controlled in various ways. In the absence of an additive in a separate liquid phase, control is effected by controlling the plasticity of the resin during formation of the structure. If the resin is sufficiently plastic during formation of the structure, the cell walls are not readily ruptured, and a structure containing all or predominantly all closed cells is obtained. Ruptured cells will actually heal in a cell-plasticized structure. If the resin is relatively rigid or brittle, all or part of the cell walls may be ruptured in a manner to connect adjoining cells one with the other, and form interconnected cells or pores which extend throughout the structure. Plasticity can be controlled by addition of a plasticizer for the resi, and/or a solvent for the resin other than the propellant, or by the selection of propellant. In general, propellants with relatively high K-B (KauriButanol) values tend to be retained more than those with lower values and thus act more as fugitive plasticizers. The relative rigidity of plasticity required for a given open or closed cell structure, as desired, is determined empirically by trial and error experimentation.

If the propellant composition includes an additive in a separate liquid phase that is emulsified in the propellant phase, the relative proportions of open and closed cells in the foamed structure of the invention depend in part upon the stability of the emulsion during the formation of the structure. If the emulsion is unstable, the emulsified droplets will tend to coalesce and interconnect, and in so doing, produce a more open pore structure. Further, it an open cell structure is preferred, it is advantageous that the discontinuous liquid phase of the emulsion should have a low surface tension, preferably less than the critical surface tension for wetting of the resin, invariably less than 45 dynes per centimeter. Then the liquid phase will have a greater tendency to spread over exposed surfaces of the structure (interior and exterior surfaces), and interfere with the healing of ruptured pores, keeping the pores open and interconnected.

The structure obtained can have open and/or closed cells of any desired size, ranging from microcellular dimensions to ½ inch in diameter, or more. The open cells are in effect closed cells one or more of those walls have been ruptured or broken through, to connect with adjoining pores, and in this way form a network of pores or through passages extending to the surface, or from surface to surface. In these cells or pores is found any liquid additive that was present in the resin propellant composition before foaming. In the case of solid additives, the solid may be in the cells or pores or in the resin matrix.

Thus, the resin structure is composed of a reticulated matrix comprising the walls defining the cells, and the relative plasticity or brittleness of this resin to a considerable extent determines the proportion of ruptured cell walls. The thinness of the walls is also a factor, but this is not readily controlled, except to the extent that it is dependent on the concentration of resin in the propellant solution. In general, the more plasticized the resin, the thicker the cell walls. If the plasticizer is volatile and fugitive, plasticity can be reduced with time, and thick-walled structures will become more rigid, and the walls will be broken when the structure is compressed or squeezed, as when it is used as an applicator, thus liberating any material held in the cells, as well as making it possible to remove water-soluble or solvent-soluble powders by leaching with water or solvent. The solvent should not attack the resin.

Accordingly, it is advantageous in accordance with the invention to control plasticity, even though only for the time required for foaming and shortly thereafter, by using a volatile plasticizer, since one can in this way control the relative proportion of open cells, and even the stage at which closed cells will be opened. This control is obtained by controlling the amount and kind of plasticizer, so as to control both the degree of plasticization and the time during which the resin is plasticized. The amount required necessarily varies with the resin, the propellant, and the plasticizer, as well as the kind of structure that is formed, and because of the number of variables an empirical determination is needed for each case, by trial and error experimentation.

The resin propellant composition is blended with a plasticizer and/or a volatile solvent for the resin or a liquid which in the presence of the other components has a solvent or plasticizing action on the resin, and the composition is foamed to form a structure. An additive may be present, but need not be, unless it also affects plasticity. The structure can then be examined for the number of open and closed cells present, and if there are too many open cells, plasticity can be increased, while if there are too many closed cells, plasticity can be reduced. In this way, the right structure can be obtained by adjustment of the formulation of the resin propellant composition. If the additive is present, the determination can be made empirically in terms of the amount or rate of additive that can be expelled from the structure.

As the propellant, there can be used in the compositions of the invention nay volatile organic compound that has a boiling temperature below 45°F. at atmospheric pressure, and that is chemically inert to the synthetic resin and the additive that may be present in the compositions. Thus, hydrocarbons such as propane, n-butane and isobutane can be employed, as well as halogenated hydrocarbons such as vinyl chloride, methyl chloride, methyl bromide, dichlorodifluoromethane (Propellant 114), 1-chloro-1,1-difluoroethane (Propellant 142B), 1,1-difluoroethane (Propellant 152A), chlorodifluoromethane (Propellant 22), 1-chloro-1,1-difluoro-2,2-trifluoroethane (Freon 115), octafluorocyclobutane (Freon C318), a mixture of dichlorodifluoromethane and 1,1-difluoroethane (Freon 500), a mixture of chlorodifluoromethane and 1-chloro-1,1-difluoro-2,2-trifluoroethane (Freon 502).

The invention is applicable to any synthetic resin that is soluble in a propellant falling within the above class or can be made soluble by the addition of a third material (such as a solvent or a material that shows solvent properties in the combination), and that is also film-forming, so that it tend to form a cohesive mass upon evaporation of a propellant solution thereof. Thermoplastic resins as a class, thermosetting resins in a propellant-soluble stage of polymerization, and propellant-soluble resins capable of being cross-linked, can be used. The polymerization or cross-linking of the latter two types of resins can be effected during or after the structure has been formed, to set the structure. Alkyl acrylate and alkyl methacrylate polymers and copolymers, such as ethyl methacrylate, butyl methacrylate, isobutyl methacrylate, 50/50 n-butyl/isobutyl methacrylate copolymer, 25/75 lauryl/isobutyl methacrylate copolymer, 30/70 stearyl/t-butyl methacrylate copolymer, 50/50 ethyl/n-butyl methacrylate copolymer, copolymers of acrylic and vinyl compounds, such as 50/50 vinyl toluene/isobutyl methacrylate copolymer, 50/35/15 vinyl toluene/ t-butyl methacrylate/stearyl methacrylate terpolymer, 50/50 ethyl acrylate/vinyl acetate copolymer, certain other vinyl polymers, such as polyvinyl acetate, vinyl toluene-butadiene copolymers, carboxylated vinyl acetate, certain cellulose derivatives, such as ethyl cellulose, cellulose acetate, cellulose propionate, cellulose acetate butyrate and cellulose acetate propionate, and certain silicon polymers such as Silicone XC-20997, are soluble in propellants of the class set forth.

Resins which can be set to a solvent insoluble stage of polymerization chemically or by radiation include urethane prepolymers, unsaturated polyesters such as unsaturated alkyd resins, and polyolefins such as polybutylene and poly-2-methyl-butene-1.

The polymer should have a molecular weight within the range from about 10,000 to about 1,000,000. Polymers of molecular weights below about 10,000 may not have sufficient cohesive strength to form a cohesive foamed structure, while those with molecular weights in excess of about 1,000,000 may be insoluble in propellant solvents. Polymers having molecular weights within the range from about 25,000 to about 600,000 are preferred.

The relative proportions of propellant and resin in the propellant compositions of the invention determine to a considerable extent the nature of the foamed structure that is formed, when the pressure upon the composition is reduced to atmospheric and the propellant allowed to volatilize rapidly. If the proportion of resin is too low (and usually the lower proportion is not less than approximately 10% resin by weight of the composition) a cohesive foamed structure is not formed, but instead a bubbly, sticky, flowable mass is obtained. If the material is expelled as a spray, through a fine orifice, a plurality of foamed particles are obtained, similar in some respects to the decorative particles obtained according to U.S. Pat. Nos. 2,716,637 and 2,773,855 referred to above. If the proportion of propellant is too low, various difficulties will be encountered, due to the high viscosity of the resin propellant solution, as well as to the toughness of the resultant foamed structure. For example, it will not only be difficult to expel the composition through a valve, but after use the valve is likely to clog or to seat itself improperly, so as to leak. Further, if an additive is present in a separate liquid phase, it will not only be difficult to obtain a reasonably stable emulsion of this phase in the propellant phase; if separation occurs it will not be possible to effect reemulsification by hand shaking.

Usually, however, the composition may contain up to 50% by weight of resin, before performance is seriously impeded by the high proportion of resin, and sometimes as much as 60% resin can be present, depending to some extent upon the molecular weight of the resin and its solubility in the propellant that is used.

The amount of propellant is within the range from about 20 to about 70% by weight of the composition, sufficient to form a coherent voluminous foamed structure containing open and/or closed cells upon rapid volatilization. The boiling point of the propellant is below 45°F. to ensure such rapid volatilization at atmospheric temperature and pressure. If volatilization is too slow, a coherent structure may not be formed rapidly, if at all, and for this reason propellants boiling at or above 45°F. are not suitable except in small amounts, as indicated below, in admixture with propellants boiling below 45°F.

In addition to the propellant and the synthetic resin, the compositions can include additional less volatile or relatively nonvolatile solvents, which may be solvents or cosolvents for the resin, or alternatively solvents for any additive that may be present, or which may be solvents for both the resin and the additive. There may also be plasticizers for the resin, coloring agents, fillers for the resin which modify the resin component of the foamed structure, and a curing agent for the resin, if the resin is in a partially polymerized condition, so that polymerization of the resin can be completed after the foamed structure has been formed, to set the structure in a desired configuration.

It is usually preferred that liquid components of the propellant composition boiling at or above 45°F. that are not propellants and that act as solvents for the resin not exceed about three times and preferably not exceed about twice the weight of resin present, and in most cases they should not exceed the weight of resin present. In general, the amount of such solvent should also not be greater than the amount by weight of propellant present. However, the exact amount that can be tolerated will depend upon the concentration of resin in the propellant composition, as well as whether the liquid is a good or poor solvent for the resin.

Liquid which are higher boiling than the propellant will modify the foamed structure. If they are also solvents for the resin, they may also plasticize the resin during the period after the propellant has been volatilized, and before the remaining less volatile solvent is fully volatilized. Such a transitional plasticized stage can be useful in forming the foamed structure into a desired configuration, and it may also aid in the formation of a higher proportion of closed or nonruptured cells.

Examples of solvents that boil about 45°F. include dichlorofluoromethane, trichlorofluoromethane, 1,1,2-trichloro-1,2,2-trifluoroethane, 1,2-dibromo-1,1,2,2-tetrafluoroethane, 1,1,2,2-tetrachloro-1,2-difluoroethane, methanol, ethanol, acetone, methyl isobutyl ketone, benzene, toluene, xylene, chloroform, methylchloroform, methylene chloride, 1,1,1-trichloroethane, and perchloroethylene.

Plasticizers can also be incorporated. These are selected according to the nature of the resin, and since they are nonvolatile permanently soften the foamed structure.

Plasticizers which may be used include butyl phthalyl butyl glycolate, tributyl citrate, acetyl tributyl citrate, tricresyl phosphate, dibutyl tartrate, dibutyl phthalate, di-2-ethylhexyl azelate, chlorinated biphenyl and methyl abietate.

Fillers for the resin can be used as extenders for the resin, and may also modify the physical properties of the foamed structure. The filler usually has a small particle size, although fibrous material also can be used. Satisfactory fillers include chalk, talc, silica, diatomaceous earth, clay, asbestos, magnesium silicate, calcium silicate, magnesium stearate, kaopolite, powdered polyethylene and powdered polystyrene. The filler can be from 0 to 300% by weight of the resin. Coloring agents including dyes and pigments are used in small proportions, ranging from 0 to 10% by weight of the resin.

The propellant compositions of the invention can be homogeneous solutions, in which all of the components present are soluble in and/or miscible with each other. In this case, any additive that is present is dissolved in the propellant with the resin, and is deposited in the cells of the structure when the propellant is volatilized as the structure is being formed. Any nonpropellant liquid will also be deposited in the cells, if it is insoluble in the resin. Any additive dissolved in this liquid will be applied with the liquid from the cells of the structure when the foamed structure is used.

The propellant compositions of the invention can also be composed of two phases, in which event the phases are emulsified one in the other, with the propellant-resin solution serving as the continuous phase. The discontinuous phase then can include, for example, a liquid solution which is the additive. When the propellant is volatilized, and the foamed resin structure is fored, the initially emulsified droplets that comprise the additive solution are then deposited in the cells, as in the case of a propellant composition that is a homogeneous solution. Such emulsions can be composed of an aqueous phase dispersed in the propellant resin solution or an organic liquid phase dispersed in the resin propellant solution. It is preferred in such emulsions that the continuous phase be the propellant resin solution.

A solid additive can also be dispered in the propellant resin solution. It will be desposited in the cells and walls of the structure when the structure is formed. Preferably, the solid additive is water-soluble and can be extracted by soaking the structure with water.

Emulsifying agents can be added in order to obtain a reasonably stable emulsion, to ensure uniformity while a portion of the material is being withdrawn from the container and converted to a foamed structure. The emulsifying agents used favor the formation of an emulsion in which the propellant resin solution is the continuous phase. However, long-tern stability of these emulsions is generally not required. It is sufficient for the formation of a satisfactory structue that the emullsion be capable fo being made uniform and sufficiently stable by hand shaking, so as to retain such uniformity when a portion of the material is expelled.

The types of emulsifiers that can be used are usually organic. They may be cationic, anionic, or nonionic. Emulsifiers are also classified as hydrophobic or hyrrophilic, hydrophobic emulsifiers tending to form emulsions in which the hydrophobic organic solvent phase, such as thepropellant resin solution, is a continuous phase, and any aqueous system present is the discontinuous phase, while a hydrophilic emulsifier tends to form a continuous phase of the aqueous portion, with the organic portion being discontinous. In general, mixtures of hydrophobic and hydrophilic emulsifiers are employed since it is possible to obtain more stable emulsions with such mixtures than with a single emulsifier. The preferred ratio of hydrophobic to hydrophilic emulsifier will depend upon the nature of the liquid that is to be emulsified. Thus, if the liquid is predominantly water, a more hydrophobic ratio is preferred than would be the case if the liquid were a polar organic liquid such as ethanol, glycerine or propylene glycol. Organic liquids that are not sufficiently polar to be soluble in water and that separate from the propellant resin solution ordinarily form reasonably stable emulsions without need for the incorporation of emulsifying agents.

Examples of hydrophobic emulsifiers are oleyl alcohol, hexadecyl alcohol, oleic acid, sorbitan monojoleate and glyceryl monostearate. Examples of hydrophilic emulsifiers include the polyethoxylated derivatives of the hydrophobic emulsifiers, coconut and tallow fatty acid soaps, sodium lauryl sulfate, and cetyl trimethyl ammonium bromide.

In general, an organic liquid that is incompatible with the polymer is preferrred for use as the solvent for any additive that is present, since it tends to be better separated from the polymer when the foamed structure is formed. Such organic solvents often form a separate liquid phase, distinct from the propellant resin solution, even though the solvent may be miscible with the propellant under normal circumstances in the absence of the resin. Further, if the liquid is compatible with or dissolved in the resin, the resin may be overplasticized if the amount of liquid is too high, and the resulting foam structure will be too soft and weak for practical use as an applicator pad. it is generally necessary for the propellant resin solution to occupy a significantly larger volume than the nonpropellant liquid phase to ensure that the propellant resin solution is the continuous phase of the emulsion. When the emulsifier system favors this type of emulsion, the relative volume occupied by the propellant resin solution can be reduced.

When alternative additives are available to perform the same function, it is preferable to select the additive that is comparatively insoluble in the resin and is quite soluble in the liquid, if any, that will subsequently occupy the cells of the foamed structure.

Any additive that is not attacked by the propellant or resin can be incorporated in the propellant compositions of the invention, and is present in an amount in excess of that which is dissolved in the resin( if any) after the propellant has been voltatilized, and the additive will remain in the foamed resin structure after the propellant has been volatilized. The additive will always be found in the cells after the structure is forned. If a liquid is present in the cells too, and the additive is soluble in the liquid, an additive solution is present in the cells. If, in addition, the additive is compatible with or soluble in the resin it will be found in the resin matrix as well, and this is particularly so when the additive is a solid and no liquid is present. The liquid if present will also permeate the resin if it is soluble therein, and an additive solution therein will do the same, if this be so. Incompatability of the additive with the resin can be ensured by providing a liquid solvent for the additive that is itself imcompatible with the polymer, thus ensuring that the additive is dissolved in the solvent, and the resulting solution is found in the cells of the structure.

Apart from these requirements, which are purely physical, any type of additive can be empolyed, depending upon the intended use for the structure.

The foamed structures of the invention, for example, are particularly useful as applicator pads for external or topical application of cosmetics of all types, such as those intended for cleansing, conditioning, lubricating, and protecting the skin, hormone preparations, suntan preparations, skin lighteners and bleach creams, foundation makeups, eye makeups, pre-shave and after-shave preparations, depilatories, hair grooming preparations, permanent wave preparations, hair straightening preparations, anti-dnadruff preparations, bath preparations, nail llcquers and removers, antiperspirants and deodorants, fragrance-imparting preparations, perfumes, baby toiletries, and hypoallergenic cosmetics. They are also useful applicators for soap and synthetic detergent preparations of all types for personal washing, laundering, dishwashing, cleansing of silver, shampoos, shaving soaps and creams, hair colorings and dye removers, wave sets, lacquers, rinses and conditioners, and dry shampoos. They are also useful applicators for medicaments of all types, anti-microbial agents, such as bactericides and anti-fungical agents of all types, and antibiotics, for external application, such as agents of all types, and antibiotics, for external application, such as topical or ectal, for instance, as suppositories.

The structures are also useful for furniture polish, shoe polish and furniture and shoe cleaners, floor cleaners, automobile cleaners and polishes, and porcelain, tile and plastic cleaners. When abrasives are included as the additive, they can serve as abrasive pads and scouring pads.

Exemplary medicaments that can be combined in the propellant compositions of the invention include the antihistamines; sulfa drugs, for example, sulfadiazine, sulfabenzamide, sulfacetamide, sulfanilamide, sulfapyridine, sulfathiazole, sulapyrazine, sulfaguanidine, sulfaphthalidine, sulfasuxidine, sullaoxazole, sulfamylon, phthalylsulfacetamide, N'-3,4-dimethylbenzoylsulfanilamide, benzylsulfanilamide and N'-2-(2-quinoxaolyl) sulfanilamide; lipotropic agents, such as methionine, choline, inositol and beta-sitosterol and mixtures thereof; local anesthetics, such as benzocaine and pramoxine hydrochloride; essential oils, such as menthol, eucalyptus oil and eugenol; salts of penicillin, such as potassium penicillin G, procaine, penicillin G, 1-ephenamine penicillin G, dibenzylamine penicillin G, and other penicillin salts disclosed in U.S. Pat. No. 2,627,491; phenoxymethylpenicillin and salts thereof; additional antibiotic agents, such as strepptomycin, dihydrostreptomycin, bacitracin, polymixin, tyrothricin, erythromycin, chloretetracycline, oxytetracycline, tetracycline, oleandomyein, chloramphenicol, magnamycin, novobiocin, closterine and neomycin; vitamins, for instance, vitamins A, $A_1$, $B_1$, $B_2$, $B_6$, $B_{12}$, and members of that family, folic acid and members of that family, and vitamins C, $D_2$, $D_3$ and E; hormones, such as cortisone, hydrocortisone, 9-$\alpha$-fluroocortison, 9-$\alpha$-flurorohydrocortisone, prednisone and prednisolone; anabolic agents, such as 11,17-dihydroxy-9-$\alpha$-fluoro-17-o-methyl-4-androsten-3-one and 17-$\alpha$-ethyl19-nortestosterone; and additional antimicrobial agents, such as mycostatin, mercurichrome, iodine, methiolate, hexachlorophene, tribromosalicylamilide, trichlorocarbanilide, and undecylenic acid.

These medicaments can be compouned in the forms of solutions and elixirs with suitable solvents and dispersants, such as are conventionally used in such formulations. Aqueous and alcoholic solutions usually are used. The amount o f medicament is not critical, and is chosen to meet the need; usually, for 0.02 to about 15% is adequate.

Cleansing compositions can be formulated containing single or multiple detergents, such as soaps and anionic synthetic detergents or soaps and nonionic synthetic detergents, or they can be composed wholly of synthetic detergents, including the anionic, cationic and nonionic types. As used herein the term "detergent" includes soaps and synthetic detergents, including the anionic, cationic and nonionic types.

Typical satisfactory anionic nonsoaps are the alkyl sulfates, such as sodium lauryl sulfate; the alkyl aryl sulfonates, such as sodium polypropylene benzene or toluene sulfonates and the sodium keryl benzene or toluene solfonates; the sulfated ethoxynated phenols, such as the ammonium salt of sulfated ethoxynated nonyl phenol, prepared by condensation of nonyl phenol with 5 molles of ethyleneoxide; the sodium fatty acid esters of taurine, such as sodium palmitic or oleic methyl tauride or mixtures thereof; the esters of higher fatty acids and hydroxy ethane sulfonates, such as oleic acid ester of hydroxy ethane sodium sulfonate; sodium lauroyl sarcosinate; sodium stearoyl llactate; sodium lauroyl llactate; sodium dioctyl sulfosuccinate; sodium lauroyl isethionate, and sodium lauryl sulfoacetate. Also useful are nonionic nonsoaps, such as the polyethylene glycol esters of the higher fatty acids, for example, polyethanoxy esters of lauric, myristic, palmitic and stearic acids, polyethanoxy ethers of lauryl alcohol, cetyl alcohol, oleyl alcohol and lanolin alcohol, the polyethanoxy ethers of alkyl phenols, such as the condensation product of octyl and nonyl phenol with five to fifty moles of ethylene oxide; the higher fatty acid esters of sorbitanethylene oxide condensates, such as the polyethanoxy esters of sorbitan monostearate; polyethanoxypolypropanoxy polyols. Cetyltrimethylammonium bromide is a typical cationic nonsoap.

The term "soap" as used herein refers to alkali metal, ammonium, and amine soaps of tfhe saturated and unsaturated higher fatty acids having frfo about 8 to about 26carbon atoms, such as capric, caprylic, lauric, myristic, palmitic, stearic, oleic, linoleic, linolenic, arachidic, hehenic, margarie, tridechoic, and cerotic acids and the mixtures of such acids naturally occurring in fats, oils, waxes and rosins, such as the soaps of coconut oil fatty acids, tallow fatty acids, lard fatty acids, fish oil fatty acids, beeswax, palm oil fatty acids, sesame oil fatty acids, peanut oil fatty acids, olive oil fatty acids, palm kernel oil fatty acids, corn oil fatty acids, babassu oil fatty acids, rosin acids, abietic acid, and greases.

Cleaning and abrasive compositions can also contain as additives water-soluble alkaline salts, including sodium silicate, borax, sodium carbonate and trisodium phosphate. Sequestering agents that are soluble in water, such as sodium hexametaphosphate, pentasodium tripolyphosphate, tetrasodium pyrophosphate, and the sodium salts of ethylenediaminetetraacetic acid or nitrilotriacetic acid, can also be used as additives, alone or with cleaning and scouring compositions.

When soaps or synthetic detergents are included in the propellant composition for the prupose of cleaning, other ingredients may also be present, such as sequestering agents, abrasives, foam boosters, and conditioning agents. These components may be present in the propellant composition in the form of a dispersed powder or dispersed liquid. The cleaning components may also be dissolved in a liquid that is emulsified in the propellant resin solution. However, the type and quantity of liquid used must be selected with care. For example, soaps and synthetic detergents that are effective water-soluble cleansing agents are also hydrophilic emulsifying agents and exhibit a pronounced tendency to form emulsions in which water is the continuous phase. To avoid this situation, which can result in the failure to form an applicator pad, the proportion of water present in the liquid phase containing the soap or synthetic detergent should be quite low, or the phase volume should be small as compared with the volume of the propellant resin solution. Often, it is advantageous to employ the cleaning components in the form of a powder dispersed in the resin propellant solution. After forming the foam structure, the cleaning agents are made available by soaking the applicator pad in water.

Germicidal detergent compositions can also be formulated, including, for instance, the 2,2'-dihydroxyhalogenated diphenyl methanes, such as G-11.

In one form of this invention, a codispensing valve may be used. Such valves are capable of simultaneously mixing and dispensing materials from two separate compartments. Thus, one compartment would contain the pad-forming composition and the other would contain the cosmetic or other additive. In this instance, somewhat more leeway is possible regarding the formulation of the additive preparation. However, if the latter contains too hydrophilic an emulsifier system, an applicator pad is not likely to form. Similarly, components of the additive that are likely to dissolve the resin foam structure rapidly should be avoided.

The propellant compositions of the invention are converted into foamed resin structures when the propellant is permitted to volatilize. This is easily accomplished, with almost immediate volatilization of most of the propellant, by storing the propellant composition in a closed container when the autogenous pressure is sufficient to maintain the propellant in the liquid phase, and then rapidly reducing the pressure to atmospheric pressure at room temperature, whereupon the propellant rapidly volatilizes and the foamed structure is formed. The propellant composition may also be stored in a closed container, under applied pressure greater than the autogenous pressure arising from the propellant itself to facilitate expelling the composition from the container, as through a valve or orifice, into the atmosphere. Because of the high volatility of the propellants employed, the resin structure is nonsticky, unless a plasticizer or other nonpropellant solvent for the resin is also present in sufficient amount to impart a sticky characteristic to the resin. if the structure is to be adhered to a surface, stickiness can be desirable. In the case of a solvent that also volatilizes, although more slowly than the propellant, this sticky condition is transitory, however, and exists only until the solvent has been removed. Excessive stickiness is undesirable in an applicator pad.

If the composition is ejected into a confined space, such as a mold, preferably closed, the foamed structure will acquire the configuration of the mold, and a molded object is obtained. The molding can be carried out at room temperature, without appliection of external pressure, since a pressure sufficient to ensure that the structure conforms to the configuration of the mold is obtained upon volatilization of the propellant at atmospheric pressure and temperatue.

Such a composition will have its ability to reproduce fine details of the mold structue enhanced by incorporating a relatively large proportion of a finely-divided filler in the propellant composition. A filler is not an additive in accordance with the invention. The proportion of filler should be rather high, ranging from approximately 25 to 300% by weight of the synthetic resin present in the composition. Suitable fillers having this effect include finely divided silica, magnesiuum silicate, calcium silicate, chalk, talc and starch.

Other suitable fillers are abrasive material, including relatively mild abrasive, such as chalk or kaopolite, or harsher abrasive, such as pumice or silica. These cannot be removed by water from the structure but can be used with soaps and/or synthetic detergents.

If the propellant composition is ejected into the atmosphere, the foamed structure will have an irregular shape. it is quite convenient, in practicing this embodiment of the invention, simply to eject the composition from the container into the hand, forming a pad of any desired size, which is controlled by controlling the duration of the ejection period. For this purpose the propellant compositions of the invention are suitably packaged in aerosol containers of the standard type, the valve being controlled by one hand, and the foamed structure being received in the other. The foamed structure is formed almost instaneously, and the applicator pad is ready for use within seconds after the procedure has begun. The structure is shape-retaining because of the nature of the resin used, and it is also flexible initially becuase of the retention of some propellant, even if no plasticizer is present, i.e., if the resin is a rigid resin.

Alternatively, the valve actuator may be shaped as a dish or a hemisphere so that it acts as a receptacle or mold for the foamed structure as it is being formed, and the interior shape of the receptacle or mold determines the shape of the foamed structure.

The compositions can be stretched to some extent and compacted as the foamed structuer is being formed, and in this way can be made to conform to the shape of the object upon which it is being applied, so as to form a covering or a coating. When applied to the body, for example, a coating including a medicament for release to the skin can be formed, which can be allowed to remain in contact with the skin for long periods, for slow release of the medicament over a long period of time. However, because the compositions are so rapidly converted into a foamed structure, they are not actually flowable, and will not spread voluntarily. In this respect, they differ from conventional aerosol paints or lacquers, from which the solvent is removed only slowly, and which are consequently flowable, and can be spread out to a film that may be only a few mils thick, and they also differ from the spreadable compositions descibed in U.S. Pat. No. 3,419,506 to Gander.

Prior to expulsion from the container, however, the compositions are flowable. The viscosity of the fluid composition is in no way critical, provided the composition is sufficiently flowable to be ejected from the container under pressure. The viscosity, accordingly, can range from a thin, quickly flowable liquid, to a rather thick, barely flowable, thixotropic or gel-like composition.

When the composition is homogeneous, or the dispersed phase remains uniformly distributed throughout the composition, the viscosity may be as high as 1,000,000 cp at atmospheric temperature. However, when the composition is likely to undergo settling or layering and it is necessary to shake before expelling a portion of the contents, it is necessary that the viscosity not exceed about 50,000 cp, and preferably it should be less than 10,000 cp, at atmospheric temperature.

In the event that the propellant employed in the compositions of the invention has a sufficient vapor pressure at ambient temperature, it will also serve as a propellant to expel the material from the pressurized container in which it is confined. In the event that its vapor pressure is insufficient, additional pressure may be provided in the container by a suitable pressurizing gas, such as nitrogen, nitrous oxide or carbon dioxide. Because commercial regulations limit the total pressure of common aerosol containers to not more than about 150 psig, the propellant employed is preferably one whose vapor pressure in the propellant does not exceed this limit.

The ability of the propellant compositions to set rapidly to form a foamed structuer is evaluated by the viscosity-settability index. The index evaluates the tendency of the material to resist flow under an applied load as it develops a set due to the evaporation of liquefied propellant. it also evauluatees the relative tendecny of a material to foam. The viscosity-settability index is determined by the following procedure:

Two square aluminum plates 3½ × 3½ inch and 0.250 inch thick, weighing 65 grams are used. The propellant composition is expelled onto the center of one plate. Thirty seconds later, the second plate is placed on top of the foaming material, and a 100 gram weight is centered on the upper plate, which is positioned so that it is level with the lower plate. The total weight pressing onthe foaming material is 165 grams. Exactly 2½ minutes later the 100 gram weight is removed, and the thickness of the foaming material between the plates is measured with a micrometer. The foam is then allowed to stand for 24 hours at room temperature, while propellant continues to escape. It then is weighed, and the weight taken as the quantity of nonvolatiles present. The test is repeated fr at least ten foam samples, using smaller and larger quantities of material, being careful to bracket a foamed mass equivalent to 1.0 gram of nonvolatiles. A plot is then made of the data, using as coordinates the film thickness of the foam under the applied load and the weight of the foam after 24 hours. A smooth curve is drawn to fit the points, and from the curve the film thickness corresponding to 1.0 gram of foamed nonvolatiles is determined. This thickness, measured in mils, is defined as the viscositysettability index.

A propellant composition giving foamed products having a viscosity-settability index which fall between approiximately 40 and 600 is appropriate for the formation of applicator pads in accordance with this invention. products that have a viscosity-settability index below about 40 tend to lack the cohesive qualities that are required of an applicator pad. On the other hand, products that have an index above about 600 tend to acquire a relatively tough, nonporous surface skin that resists penetration by fluids, and actually expand substantially under the force of the 165 grams used in the test, instead of becoming flattened. it will be evident that a tough surface skin is an undesirable characteristic for an applicator pad that is intended to transfer material as the result of the flow of liquid through the pad. Further, any excessive tendency for a pad to puff and become more rounded interferes with its ease of use, since the applicator pads are most conveniently used when they are flat.

The propellant compositions of the invention can be packaged in containers of the type commonly known as an aerosol can, fitted with a nonatomizing dicharge valve which will allow a foamed discharge. The valve is nonatomizing, to prevent the discharge in the form of droplets or a spray or mist. The discharge is in the form of a coherent foaming expanding mass or pad.

The propellant compositions are prepared by conventional procedures. For example, the solid and normally liquid ingredients may be combined and stirred until the composition is uniform. Suitable portions are then dosed into individual aerosol cans, which are capped and pressurized in conventional fashion with the normally-gaseous liquefied propellants. The individual packages are shaken or otherwise agitated until the polymer dissolves and the composition is uniform. Alternatively, all of the ingredients may be combined and stirred in an autoclave until the polymer dissolves and the composition is uniform. The cans are filled and capped before releasing the pressure on the material. With any of these procedures, heat can be used to increase the rate at which the polymer dissolves.

In another embodiment, the aerosol can will contain a piston or bellows which separates the interior of the can into two compartments or zones. The first compartment, which contains the material to be dispensed, is in communication with the discharge valve. The second compartment is filled with a secondary propellant which provides pressure in the container which is in excess of the vapor pressure of the composition in the first compartment. The secondary propellant may be a compressed gas such as nitrogen or a normally gaseous liquid propellant. The latter is preferred since it provides a constant back-up pressure to expel the material. Examples of such cans are disclosed in U.S. Pat. Nos. 2,815,152, 3,245,591 and 3,407,974.

In another embodiment, encapsulated liquid components may be mixed with the material in the container. The use of microcapsules is preferrred, because the presence of larger capsules of liquid components will result in a pad that feels rough and grainy. Soft gelatin capsules may be used which will dissolve when the pad is immersed in warm water, thereby releasing the liquid.

The following Examples represent embodiments of the invention.

EXAMPLES 1 to 3

These Examples are of two-part compositions that can be mixed together at the time each is ejected from an aerosol container, and when so mixed form a propellant composition of the invention, which immediately forms a foamed resin structure. In these Examples, the propellant resin solution is in the larger compartment of the aerosol can, which is usually the can itself, and the liquid which is being dispensed at the same time as the propellant resin solution, and which serves as the additive deposited in the cells of the formed structure, is in the smaller compartment of the can.

1.

Mineral oil, 38/40 SSU visocosity at 100°F. is placed in the smaller compartment of an aerosol continer equipped with a codispensing valve. n-Butylmethacrylate polymer is then placed in the larger compartment of the can, and the valve is clinched in position. There is then added throughthe valve a mixture of 1,1,2,2-tetrafluoro-1,2-dichloroethane and 1,1-chlorodifluoreoethane, and the can is shaken until the polymer dissolves. Theproportions of the two propellants are such that the propellant resin solutin has the following composition:

| | Parts by Weight |
|---|---|
| n-Butyl methacrylate polymer (about 300,000 mol. wt.) | 21 |
| 1,1,2,2-tetrafluoro-1,2-dichloroethane | 42 |
| 1,1,1-chlorodifluoroethane | 37 |

When the valve is opened, the propellant resin solution and mineral oil are simultaneously mixed and ejected, and instantly form a foamed structure in the shape of a pad whenthe composition is ejected into the hand. Mineral oil oozes from the pad, and the pad is useful for applying the mineral oil to a baby.

2.

Example 1 is repeated, but a 50% by weight solution of ethanol in water is placed in the smaller compartment in place of mineral oil. The pad that is obtained from this composition is suitable as an alcohol applicator, such as an antiseptic, alcohol rub, or aftershave.

3.

Example 1 is repeated, but in the smaller compartment the following emulsion is placed:

| | Parts by Weight |
|---|---|
| Carboxylated vinyl terpolymer (Carbopol 934) | 0.2 |
| Triethanolamine | 0.4 |
| Ethoxylated oleyl alcohol containing two ethoxy groups per molecule | 2 |
| Mineral oil 38/40 SSU viscosity at 100°F. | 47.4 |
| Water | 50.0 |

The pad obtainable from this composition is useful as a cleansing lotion applicator for the purpose of removing make-up from the skin.

EXAMPLE 4

This Example illustrates a propellant composition that forms an applicator pad suitable for use as a mildly antiseptic wet dressing.

A propellant composition was formed to the following formulation:

| | Parts by Weight |
|---|---|
| Isobutyl methacrylate polymer (about 350,000 mol. wt.) | 18 |

-Continued

| | Parts by Weight |
|---|---|
| Boric acid | 15 |
| Ethoxylated coco amine containing two ethoxy groups per molecule | 1 |
| Butylphthalyl butyl glycolate | 4 |
| Pyrogenic silica | 2 |
| 1,1,1-chlorodifluoroethane | 29 |
| 1,1,2,2-tetrafluoro-1,2-dichloroethane | 8 |
| Dichlorodifluoromethane | 23 |

EXAMPLE 5

This Example illustrates a propellant composition that forms an applicator pad that is suitable for use with water as a haemostat or as an astringent.

The following propellant formulation was employed:

| | Parts by Weight |
|---|---|
| n-Butyl methacrylate polymer (about 350,000 mol. wt.) | 17 |
| Corn starch | 10 |
| Aluminum chlorhydroxide complex | 9 |
| Pyrogenic silica | 2 |
| Ethoxylated coco amine containing two ethoxy groups per molecule | 3 |
| 1,1,2,2-tetrafluoro-1,2-dichloroethane | 16 |
| 1,1,1-chlorodifluoroethane | 28 |
| Dichlorodifluoromethane | 23 |

EXAMPLES 6 and 7

These Examples illustrate propellant compositions that form washing pads suitable for use with water.

| Example 6: | Parts by Weight |
|---|---|
| n-Butyl methacrylate polymer (about 300,000 molecular weight) | 18 |
| Coconut fatty acid ester of sodium isethionate | 11 |
| Pyrogenic silica | 2 |
| Coconut fatty acid-diethanolamine condensate | 2 |
| Butyl stearate | 2 |
| Ethoxylated coco amine containing two ethoxy groups per molecule | 1 |
| 1,1,2,2-tetrafluoro-1,2-dichloroethane | 18 |
| 1,1,1-chlorodifluoroethane | 30 |
| Dichlorodifluoromethane | 16 |

| Example 7 | Parts by Weight |
|---|---|
| 20/80 Stearyl/isobutyl methacrylate copolymer (about 75,000 molecular weight) | 20 |
| Coconut fatty acid ester of sodium isethionate | 10 |
| Coconut fatty acid-diethanolamine condensate | 2 |
| Butyl stearate | 1 |
| Isopropanol | 1 |
| 1,1,2,2-tetrafluoro-1,2-dichloroethane | 35 |
| Dichlorodifluoromethane | 31 |

EXAMPLE 8

This Example illustrates a propellant composition that forms an applicator pad that can be used with water as a particularly effective scrub due to the presence of both a bacteriostatic agent and an abrasive:

| | Parts by weight |
|---|---|
| n-Butyl methacrylate polymer (about 300,000 molecular weight) | 16 |
| Coconut fatty acid ester of sodium isethionate | 7 |
| Silica (over 200 mesh) | 16 |
| 3,4,4-trichlorocarbanilide | 1.3 |
| Coconut fatty acids-diethanolamine condensate | 1.6 |
| Butyl stearate | 1.6 |
| Ethoxylated coco amine containing two ethoxy groups per molecule | 0.5 |
| 1,1,2,2-tetrafluoro-1,2-dichloroethane | 16 |
| 1,1,1-chlorodifluoroethane | 26 |
| Dichlorodifluoromethane | 14 |

EXAMPLES 9 and 10

These Examples illustrate compositions that form applicator pads that can be used to apply mineral oil or vegetable oil for lubricating the skin. If desired, additives that are soluble in the mineral oil or vegetable oil can also be included, and these will be transferred to the skin with the oil when the pad is applied to the skin.

| | Parts by Weight | |
|---|---|---|
| | Example 9 | Example 10 |
| Ethyl methacrylate polymer (about 180,000 molecular weight)[1] | 14 | 14 |
| Corn starch | 10 | 10 |
| Pyrogenic silica | 1 | 1 |
| Mineral oil 38/40 SUS at 100°F. | 13 | — |
| Glyceryl trioleate | — | 13 |
| Tributyl citrate | 5 | 5 |
| Trichlorofluoromethane | 15 | 12 |
| 1,1,1-chlorodifluoroethane | 34 | 34 |
| Dichlorodifluoromethane | 8 | 11 |

[1]Determined by viscosity measurement

EXAMPLES 11 and 12

These two Examples illustrate propellant compositions that form applicator pads that bleed out oil and also when used with water transfer a detergent to the skin for cleansing purposes. These compositions are particularly effective for removing facial makeup and can be used with or without water. Since they deposit an oil film that is not completely removed with water, their function is similar to a cleansing cream or lotion.

| | Parts by Weight | |
|---|---|---|
| | Example 11 | Example 12 |
| Ethyl methacrylate polymer (about 180,000 molecular weight) | 14 | 14 |
| Coconut fatty acid ester of sodium isethionate | 10 | 10 |
| Calcium silicate | 1 | 1 |
| Mineral oil 38/40 SUS | 13 | — |
| Glyceryl trioleate | — | 13 |
| Tributyl citrate | 5 | 5 |
| 1,1,2,2-tetrafluoro-1,2-dichloroethane | 12 | 12 |
| 1,1,1-chlorodifluoroethane | 34 | 34 |
| Dichlorodifluoromethane | 11 | 11 |

[1]Determined by viscosity measurement

EXAMPLES 13 and 14

These Examples illustrate compositions that form applicator pads suitable for use as dry shampoo applicators. These pads bleed out the organic solvent slowly, so that the pads are damp rather than wet. When rubbed against the hair, they loosen soil and sebum, which is transferred to the surface of the pad, and so removed with the pad.

|  | Parts by Weight | |
|---|---|---|
|  | Example 13 | Example 14 |
| Ethyl methacrylate polymer (about 450,000 molecular weight)[1] | 15 | — |
| Polyvinyl acetate (about 100,000 mol. wt.) | — | 21 |
| Tributyl citrate | 10 | 10 |
| Pyrogenic silica | 1 | 1 |
| Isoparaffinic hydrocarbon solvent, boiling range 350 to 400°F. | 10 | 7 |
| Calcium silicate | 3 | — |
| Ethyl alcohol | 6 | — |
| Hexadecyl alcohol | — | 7 |
| Propylene glycol | — | 7 |
| 1,1,1-chlorodifluoroethane | 44 | 47 |
| Dichlorodifluoromethane | 11 | — |

[1]Determined by viscosity measurement

EXAMPLE 15

This Example illustrates a composition that forms an applicator pad suitable for use as a combination cleaner and polish for use on wood, leather, metal or plastic.

|  | Parts by Weight |
|---|---|
| Ethyl methacrylate polymer (about 450,000 molecular weight)[1] | 17 |
| Tributyl citrate | 6 |
| Hexylene glycol | 6 |
| Isoparaffinic hydrocarbon solvent, boiling range 242 to 290°C. | 23 |
| DC-200 silicone fluid (500,000 centistokes) | 1.5 |
| Carnauba wax | 1.5 |
| 1,1,1-chlorodifluoroethane | 45 |

[1]Determined by viscosity measurement

EXAMPLES 16 to 18

These Examples illustrate propellant compositions that form applicator pads that ooze an aqueous solution. They may be used for cleaning purposes, such as for a personal deodorant wipe.

|  | Parts by Weight | | |
|---|---|---|---|
|  | Example 16 | Example 17 | Example 18 |
| 10/90 Stearyl/iso-butyl methacrylate copolymer[1] | 15 | 15.5 | 18.5 |
| Wood cellulose fiber | 2.4 | — | 0.5 |
| Hydrophobic pyrogenic silica | — | 1.5 | 1.5 |
| Calcium silicate | 3.8 | — | — |
| Magnesium stearate | — | 3.8 | — |
| Hexadecyl alcohol | 2.3 | 2.3 | 4.5 |
| Ethoxylated oleyl alcohol containing two ethoxy groups per molecule | 1.5 | 0.8 | 1.5 |
| Ethyl alcohol | 5.3 | 7.7 | — |
| Water | 17.7 | 7.7 | 7.5 |
| 1,1,2,2-tetrafluoro-1,2-dichloroethane | 27 | 28 | 27 |
| Dichlorodifluoromethane | 25 | 25 | 24 |
| Hexachlorophene | 0.2 | 0.2 | 0.2 |

[1]About 75,000 molecular weight

EXAMPLES 19 to 23

These Examples illustrate propellant compositions that produce applicator pads that liberate solutions of pharmaceutical ingredients.

19.

This propellant composition gives an applicator pad useful as a counterirritant and stimulant.

|  | Parts by Weight |
|---|---|
| Ethyl methacrylate polymer (about 180,000 molecular weight) | 14 |
| Corn starch | 10 |
| Pyrogenic silica | 1 |
| Mineral oil 38/40 SUS | 13 |
| Menthol | 0.3 |
| Tributyl citrate | 5 |
| Trichlorofluoromethane | 15 |
| 1,1,1-Chlorodifluoroethane | 34 |
| Dichlorodifluoromethane | 8 |

20.

This Example illustrates a propellant composition that yields an applicator pad useful to apply a fungicide to the skin, for the treatment of athelete's foot, for example.

|  | Parts by Weight |
|---|---|
| Ethyl methacrylate polymer (about 180,000 molecular weight) | 14 |
| Corn starch | 10 |
| Pyrogenic silica | 1 |
| Glyceryl trioleate | 13 |
| Undecylenic acid | 1.3 |
| Tributyl citrate | 5 |
| Trichlorofluoromethane | 12 |
| 1,1,1-Chlorodifluoroethane | 34 |
| Dichlorodifluoromethane | 11 |

21.

This Example is for a propellant formulation that yields an applicator that is useful as a rubbing or rubrifacient composition.

|  | Parts by Weight |
|---|---|
| 50/35/15 Vinyltoluene/iso-butyl methacrylate/lauryl methacrylate terpolymer (75,000 molecular weight) | 15 |
| Wood cellulose fiber | 2.4 |
| Calcium silicate | 3.8 |
| Hexadecyl alcohol | 2.3 |

22.

This Example illustrates a propellant composition that produces an applicator pad which is useful for applying an anesthetic composition topically to the skin.

| | Parts by Weight |
|---|---|
| 50/35/15 Vinyl toluene/iso-butyl methacrylate/stearyl methacrylate terpolymer (about 75,000 molecular weight) | 15 |
| Wood cellulose fiber | 2.4 |
| Calcium silicate | 3.8 |
| Hexadecyl alcohol | 2.3 |
| Ethoxylated oleyl alcohol containing two ethoxy groups per molecule | 1.5 |
| Ethyl alcohol | 5.3 |
| Water | 17.7 |
| Pramoxine hydrochloride | 0.25 |
| 1,1,2,2-tetrafluoro-1,2-dichloroethane | 27 |
| Dichlorodifluoromethane | 25 |

(Continued)

| | Parts by Weight |
|---|---|
| Ethoxylated oleyl alcohol containing two ethoxy groups per molecule | 1.5 |
| Ethyl alcohol | 5.3 |
| Water | 17.7 |
| Methylnicotinate | 0.5 |
| 1,1,2,2-tetrafluoro-1,2-dichloroethane | 27 |
| Dichlorodifluoromethane | 25 |

23.

A propellant composition yielding on applicator pad containing a counter irritant and antiseptic composition for possible application to the skin is prepared to the following formulation:

| | Parts by Weight |
|---|---|
| 20/80 Stearyl/t-butyl methacrylate copolymer (about 75,000 molecular weight) | 15 |
| Wood cellulose fiber | 2.4 |
| Calcium silicate | 3.8 |
| Hexadecylalcohol | 2.3 |
| Ethoxylated oleyl alcohol containing two ethoxy groups per molecule | 1.5 |
| Ethyl alcohol | 5.3 |
| Water | 17.7 |
| Resorcinol | 2.3 |
| 1,1,2,2-tetrafluoro-1,2-dichloroethane | 27 |
| Dichlorodifluoromethane | 25 |

EXAMPLES 24 and 25

These Examples illustrate propellant compositions that form applicator pads suitable for use as porcelain or tile cleaners.

| | Parts by weight | |
|---|---|---|
| | Example 24 | Example 25 |
| n-Butyl methacrylate polymer (about 350,000 molecular weight) | 31 | 31 |
| Talc | 16 | 16 |
| Organic silicone fluid | 0.7 | 0.7 |
| Mineral oil 38/40 SUS at 100°F. | 9 | 12 |

(Continued)

| | Parts by weight | |
|---|---|---|
| | Example 24 | Example 25 |
| Kerosene | 16 | 6 |
| Trichlorofluoromethane | — | 6 |
| 1,1,1-chlorodifluoroethane | 27.3 | 28.3 |

Examples 26 through 30 illustrate compositions that form stable plastic foams suitable for use as packaging foams, for decorative effects, or for arts and crafts.

| | Parts by Weight | | | | |
|---|---|---|---|---|---|
| Examples | 26 | 27 | 28 | 29 | 30 |
| Isobutyl methacrylate polymer[1] | 33 | — | — | — | — |
| Polystyrene[2] | — | 60 | — | — | — |
| Polyvinyl acetate[3] | — | — | 47 | — | — |
| Ethyl hydroxyethylcellulose | — | — | — | 50 | — |
| 75/25 Isobutyl/ethyl methacrylate copolymer[4] | — | — | — | — | 44 |
| Santicizer B16 | — | 7 | — | — | — |
| Methylenechloride | — | 8 | 9 | — | — |
| Propellant 21 | 10 | — | — | — | 9 |
| Propellant 142B | — | 25 | 44 | 50 | — |
| Propellant 114 | 28.5 | — | — | — | — |
| Propellant 12 | 28.5 | — | — | — | 47 |

[1]About 350,000 molecular weight
[2]About 60,000 molecular weight
[3]About 100,000 molecular weight
[4]About 300,000 molecular weight Examples 31 through 35 illustrate compositions that are suitable for casting or modeling.

| | Parts by Weight | | | | |
|---|---|---|---|---|---|
| Examples | 31 | 32 | 33 | 34 | 35 |
| Ethyl methacrylate about 450,000 molecular weight) | — | 28 | 16 | 38 | 15 |
| Methyl methacrylate about 90,000 molecular weight) | 14 | — | — | — | — |
| Elvacite 2045 about 350,000 molecular weight) | — | — | 3.6 | — | 3.8 |
| Chalk | 42 | 28 | 20 | 9 | 19 |
| Citroflex 4 | 11 | — | — | — | — |
| Piccolastic E-75 | 11 | — | — | — | — |
| Diglycol laurate | — | 2.5 | — | — | — |
| Ethanol | — | 2.5 | — | — | — |
| Silicone L522 | 0.7 | 1.5 | — | 1 | — |
| n-Pentane | — | — | 6.4 | — | — |
| Freon 113 | — | 17 | — | — | — |
| Propellant 114 | — | 7.5 | — | 30 | 33 |
| Propellant 21 | 21.3 | 13 | — | 22 | 14 |
| Propellant 142B | — | — | 54 | — | 15.2 |

Examples 36 through 38 illustrate compositions that expand to foams that are suitable for cleaning tiles, porcelain, walls and other hard surfaces.

| | Parts by Weight | | |
|---|---|---|---|
| Examples | 36 | 37 | 38 |
| Ethyl methacrylate (about 180,000 molecular weight) | 26 | — | — |
| Elvacite 2044 (about 300,000 molecular weight) | — | 31 | 31 |
| Talc | 13 | 16 | 16 |
| Diglycol laurate | 13 | — | — |
| Silicone L522 | 0.5 | 0.7 | 0.7 |
| Peneteck 38/40 | 13 | — | — |

-Continued

| Examples | Parts by Weight | | |
|---|---|---|---|
| | 36 | 37 | 38 |
| Drakeol No. 19 | — | — | 12 |
| Klearol | — | 9 | — |
| Deobase | — | — | 6 |
| Isopar M | — | 16 | — |
| Freon 11 | — | — | 6 |
| Genetron 142B | 34.5 | 27.3 | 28.3 |

Examples 39 and 40 illustrate compositions that expand to foams that may be used as abrasive scouring pads.

| Examples | Parts by Weight | |
|---|---|---|
| | 39 | 40 |
| Elvacite 2045 (about 350,000 molecular weight) | — | 28 |
| Ethyl methacrylate (450,000 molecular weight) | 35.8 | — |
| Abitol | — | 7.5 |
| Citroflex A4 | 13 | — |
| Ethanol | 1.4 | — |
| Silicone L522 | 0.2 | 0.2 |
| Pumice | 12 | 9.4 |
| Sodium dodecylbenzene sulfonate | 2.4 | 2.4 |
| Genetron 21 | 5.6 | 4.5 |
| Freon 114 | 15 | 24 |
| Freon 12 | 15 | 24 |

Example 41 illustrates a detergent pad for washing dishes:

| Example | Parts by Weight |
|---|---|
| | 41 |
| 20/80 Lauryl/methyl methacrylate copolymer (about 150,000 molecular weight) | 40 |
| Soap, powdered | 8 |
| Lauryldiethanolamide | 4 |
| Mineral oil, 38/40 SUS | 4 |
| Genetron 142B | 44 |

Examples 42 through 44 illustrate compositions that produce foams that adhere to most surfaces and may be used for insulation, to fill cracks, and for minor repairs.

| Examples | Parts by Weight | | |
|---|---|---|---|
| | 42 | 43 | 44 |
| Ethyl methacrylate (about 180,000 molecular weight) | — | 32 | — |
| Elvacite 2044 (about 300,000 molecular weight) | 34 | — | — |
| Vitel 207 | — | — | 50 |
| Talc | 17 | 16 | — |
| Decane | 22 | — | — |
| VP & M Naphtha | — | 12 | — |
| Santicizer B16 | — | 6 | — |
| Silicone L522 | — | 0.7 | — |
| Methylene chloride | — | — | 25 |
| Genetron 21 | — | 10 | — |
| Freon 114 | 18.7 | 13.3 | — |
| Genetron 142B | 3.8 | 10 | 25 |
| Freon 12 | 4.5 | — | — |

Examples 45 through 48 illustrate compositions that produce plastic foams suitable for cleaning and polishing furniture.

| Examples | Parts by Weight | | | |
|---|---|---|---|---|
| | 45 | 46 | 47 | 48 |
| Elvacite 2044 (about 300,000 molecular weight) | 34 | 31.5 | — | — |
| Elvacite 2045 (about 350,000 molecular weight) | — | — | 32.5 | — |
| Elvacite 2046 (about 350,000 molecular weight) | — | — | — | 33 |
| Silicone L522 | 2 | 0.5 | 1.3 | — |
| Peneteck 38/40 | 22 | 0 | 16 | 16 |
| Drakeol 15 | — | 11 | — | — |
| Deobase | — | 5 | 5.4 | 5.2 |
| GE-SF 96-1000 | — | 5 | 2.5 | 2.6 |
| Carnauba wax | — | 1 | 1.6 | 1.6 |
| Ceresin wax (150°F.) | — | 1 | — | — |
| Talc | 17 | 16 | — | — |
| Freon 114 | 13.6 | 8 | 21.3 | 21.3 |
| Genetron 142B | 11.4 | 22 | 11 | 7.3 |
| Freon 12 | — | — | 8 | 13 |

Examples 49 through 53 illustrate compositions that may be used to form orthopedic casts.

| Examples | Parts by Weight | | | | |
|---|---|---|---|---|---|
| | 49 | 50 | 51 | 52 | 53 |
| Ethyl methacrylate (about 450,000 molecular weight) | 20 | 17 | — | — | — |
| Ethyl methacrylate (about 180,000 molecular weight) | — | — | 35 | 28 | 28 |
| Elvacite 2045 (about 350,000 molecular weight) | 4 | 4.3 | — | — | — |
| Elvacite 2044 (about 300,000 molecular weight) | — | — | 6 | 4.6 | 2 |
| Elvacite 2013 (about 90,000 molecular weight) | — | — | — | — | 2.6 |
| Chalk | 24 | 21.7 | — | — | — |
| Plaster of paris | — | — | 5.3 | 4.1 | 4.1 |
| Starch | — | — | 2.7 | 2.0 | 2.0 |
| Ester gum | — | 2 | — | — | — |
| Piccolastic A25 | — | — | — | 2.0 | 2.0 |
| Genetron 21 | — | — | 3 | 1 | 1 |
| Genetron 142B | 52 | 55 | 48 | 58.3 | 58.3 |

In the preceding examples many materials have been identified, for brevity, by the trademarks under which they are commercially available. These trademarked materials are more specifically identified as follows:

| | |
|---|---|
| Abitol | hydroabietyl alcohol |
| Citroflex A4 | acetyl tributyl citrate |
| Citroflex 4 | tributyl citrate |
| Deobase | kerosene |
| Drakeol 15 | mineral oil, 145-155 SUS |
| Drakeol 19 | mineral oil, 185-195 SUS |
| Elvacite 2013 | methyl methacrylate polymer |
| Elvacite 2044 | n-butylmethacrylate polymer |
| Elvacite 2045 | isobutylmethacrylate polymer |
| Elvacite 2046 | 50/50 n-butyl/isobutyl methacrylate copolymer |
| Freon 11 | trichloromonofluoromethane |
| Freon 12 | dichlorodifluoromethane |
| Freon 113 | 1,1,2-trichlorotrifluoroethane |
| Freon 114 | 1,2-dichlorotetrafluoroethane |
| Genetron 21 | dichlorofluoromethane |
| Genetron 142B | 1,1-difluoro-1-chloroethane |
| GE-SF-96-1000 | dimethylpolysiloxane, 1000cts |
| Isopar M | isoparaffins (B.P. 400°-480°F.) |
| Klearol | mineral oil, 50-60 SUS |
| Peneteck 388/40 | mineral oil, 38-40 SUS |
| Piccolastic A25 | styrene polymer |
| Piccolastic E75 | styrene polymer |
| Santicizer B16 | butyl phthalyl butyl glycolate |
| Silicone L522 | organo-silicone fluid |
| Vitel 207 | polyester polymer |

EXAMPLE 54

This Example illustrates a composition that is suitable for use as a molding composition to reproduce fine details in a closed mold.

| | Parts by Weight |
|---|---|
| Polyvinyl acetate (about 200,000 molecular weight) | 19 |
| Magnesium trisilicate | 14 |
| Pyrogenic silica | 1 |
| Tributyl citrate | 2 |
| Isopropanol | 2 |
| Trichloromonofluoro methane | 4 |
| 1,1-difluoro-1-chloroethane | 46 |
| Dichlorodifluoro methane | 12 |

EXAMPLES 55 and 56

Examples 55 and 56 illustrate compositions that form pads loaded with liquid detergent when expelled from their containers. The liquid detergent is considered to be a light duty detergent in Example 55, and a heavy duty detergent in Example 56. The difference is due to the presence of the sequestering agent, trisodium nitrilotriacetate, in the latter Example.

| | Parts by Weight | |
|---|---|---|
| | 55 | 56 |
| 20/80 Stearyl/isobutyl methacrylate copolymer (about 75,000 molecular weight) | 17 | 16 |
| Sodium lauryl sulfate | 7 | 7 |
| Trisodium nitrilotriacetate | — | 3 |
| Hexadecyl alcohol | 2 | 2 |
| Ethanol | 21 | 20 |
| Water | 7 | 7 |
| 1,2-dichloro-1,1,2-tetra-fluoroethane | 24 | 24 |
| Dichlorodefluoromethane | 22 | 21 |
| 1,2-dichloro-1,1,2,2-tetrafluoro | 22 | 21 |

EXAMPLES 57 and 58

Example 57 illustrates a composition that forms an applicator pad capable of transferring the sunscreening agent, glyceryl p-aminobenzoate, to the skin. The pad formed from the composition of Example 58 oozes an aqueous solution containing the depilatory, sodium thioglycolate.

| | Parts by Weight | |
|---|---|---|
| | 57 | 58 |
| 20/80 Stearyl/isobutyl methacrylate copolymer (about 75,000 molecular weight) | 17 | 16 |
| Oleyl sarcosine | 2 | 2 |
| Polyethanoxy-polypropanoxy polyol | 2 | 2 |
| Glyceryl p-aminobenzoate | 1 | — |
| Ethanol | — | 4 |
| Propylene glycol | 6 | 9 |
| Water | 12 | — |
| 1,2-dichloro-1,1,2,2,-tetrafluoro ethane | 20 | 27 |
| Dichlorodifluoro-methane | 20 | 20 |

EXAMPLE 59

Example 59 illustrates a composition that forms an applicator pad that oozes an aqueous alcohol solution suitable for use as an antiseptic alcohol wipe.

| | Parts by Weight |
|---|---|
| 50/50 Vinyltoluene/isobutyl methacrylate copolymer (about 75,000 molecular weight) | 16 |
| Ethanol | 16 |
| Water | 8 |
| 1,2-dichloro-1,1,2,2-tetrafluoroethane | 30 |
| Dichlorodifluoromethane | 30 |

EXAMPLE 60

Example 60 illustrates a composition that forms a pad that may be used to apply the insect repellent, 2-ethyl hexane diol-1,3, to the skin.

| | Parts by Weight |
|---|---|
| 20/80 Stearyl/isobutyl methacrylate copolymer (about 75,000 molecular weight) | 17 |
| Oleyl alcohol | 2 |
| Ethoxylated oleyl alcohol containing three ethoxy groups per molecule | 2 |
| 2-Ethyl hexane diol-1,3 | 7 |
| Ethanol | 13 |
| Water | 13 |
| 1,2-dichloro-1,1,2,2-tetra-fluoroethane | 24 |
| Dichlorodifluoromethane | 22 |

Having regard to the foregoing disclosure, the following is claimed as the inventive & patentable embodiments thereof:

1. A liquid propellant composition comprising a liquid propellant phase comprising a solution containing a film-forming synthetic polymer selected from the group consisting of thermoplastic resins, thermosetting resins in a thermoplastic propellant-soluble state, and cross-linkable resins in a thermoplastic propellant-soluble state in an amount within the range from about 10 to about 60% by weight of the composition and a liquid propellant boiling below 45° F. at atmospheric pressure and retained in the composition in the liquid phase at a superatmospheric pressure, the propellant being inert to the synthetic polymer and the additive, and being in a sufficient amount within the range from about 20 to about 70% by weight of the composition to form upon rapid volatilization of the propellant at atmospheric temperature and pressure a coherent, voluminous foamed structure containing open and/ or closed cells; the composition also comprising an additive which is in an amount within the range from about 5 to about 700% by weight of the polymer, in excess of the amount soluble in the polymer in the absence of the propellant, and which is deposited in the cells or cells and walls of the structure when the propellant volatilizes, and which can be removed in liquid form from the cells of the structure by compression of the structure or by leaching with a solvent in which the additive is soluble but in which the foamed structure is insoluble, any organic liquid present which is a solvent for the polymer and boils at or about 45° F at atmospheric pressure and which is in the propellant phase being in an amount from about zero up to about three times the amount of polymer present in the propellant phase.

2. A liquid propellant composition according to claim 1, in which the additive is in liquid form as a solution in a separate liquid phase that is itself dispersed in the propellant phase of the composition.

3. A liquid propellant composition according to claim 1, in which the additive is a antiperspirant 4. A liquid propellant composition according to claim 1, in which the additive is an aqueous solution.

5. A liquid propellant composition in accordance with claim 1, in which the additive is in liquid form as a solution with the propellant 6. A liquid propellant composition in accordance with claim 1, in which the additive is in liquid form as dispersed in the propellant.

7. A liquid propellant composition in accordance with claim 1, in which the additive is in liquid form as a separate liquid phase that is itself dispersed in the propellant phase of the composition.

8. A liquid propellant composition in accordance with claim 7, in which the additive is an aqueous solution that is itself dispersed in the propellant phase of the composition.

9. A liquid propellant composition according to claim 1, in which the additive is in liquid form as a dispersion in a separate liquid phase that is itself dispersed in the propellant phase of the composition.

10. A liquid propellant composition according to claim 9, in which the separate liquid phase is an aqueous phase.

11. A liquid propellant composition according to claim 1, in which an organic liquid solvent for the polymer is present in solution in the propellant phase.

12. A liquid propellant composition according to claim 11, in which the organic solvent is a lower alkanol having up to three carbon atoms.

13. A liquid propellant composition according to claim 12, in which the propellant is a mixture of dichlorodifluoromethane and 1,1-dichlor-1,1,2,2,-tetrafluoroethane.

14. A liquid propellant composition according to claim 1 wherein the liquid propellant is inert to the synthetic polymer; wherein the additive is in liquid or solid form at atmospheric temperature and pressure in an amount in excess of any solubility of the additive in the polymer in the absence of the propellant, the additive being substantially inert to the synthetic polymer and to the propellant, the foamed structure being in a shaped form for immediate use as a pad from which the additive can be removed in liquid form by compression of the pad.

15. A liquid propellant composition according to claim 1 which, upon rapid volatilization of the propellant at atmospheric temperature and pressure forms a foamed polymeric structure which immediately is nonsticky, coherent, voluminous and self-supporting, which contains the additive, and which is in a shaped form for immediately use as a pad, from which the aqueous phase and the additive can be removed in liquid form by compression of the pad.

16. A liquid propellant composition according to claim 15 which contains up to 50% by weight of the snythetic polymer.

17. A liquid propellant composition according to claim 16 in which the polymer is dissolved in a liquid comprising, in addition to the liquid propellant, a solvent which has a boiling point above 45° F., said solvent being present in an amount not exceeding three times the weight of polymer and not exceeding the weight of propellant.

18. A liquid propellant compostion according to claim 16 in which the polymer is polyisobutyl methacrylate.

19. A liquid propellant composition according to claim 1, in which the synthetic polymer is selected from the group consisting of cellulose derivatives, vinyl polymers and vinyl copolymers.

20. A liquid propellant composition according to claim 19, in which the vinyl polymer is a methacrylate polymer or copolymer.

21. A liquid propellant composition according to claim 20, in which the vinyl polymer is polyisobutyl methacrylate.

22. A liquid propellant composition according to claim 1 in which the additive is selected from the group consisting of antimicrobial agents, coating compositions, fungistatic agents, fungicidal agents, abrasives, detergents, antibiotics, antiperspirants, medicaments, silicone oils, mineral oils and vegetable oils.

23. A process for forming a foamed structure, which comprises expelling from a closed container a liquid propellant composition according to claim 1, and volatilizing the propellant at atmospheric temperature and pressure to foam the synthetic polymer and form a foamed structure containing the additive in thecells or pores thereof.

24. A process according to claim 23, in which the composition is expelled from an aerosol container by one hand into the other hand, and a foamed structure in the form of an applicator pad is formed in the other hand, ready for use to apply the additive to a surface.

25. A process according to claim 24 which comprises the additional step of removing the additive in liquid form from the pad.

26. A process according to claim 25 in which the liquid propellant is inert to the synthetic polymer, the additive is in liquid or solid form at atmospheric temperature and pressure in an amount in excess of any solubility of the additive in the polymer in the absence of the propellant, the additive being substantially inert to the synthetic polymer and the propellant.

27. A process according to claim 26 wherein the additive is removed in liquid from from the pad by compression of the pad.

28. A process according to claim 26 wherein the composition contains up to about 50% by weight of the synthetic polymer.

29. A process according to claim 28 wherein the polymer is dissolve in a liquid comprising, in addition to the liquid propellant, a solvent which has a boiling point about 45° F., the solvent being present in an amount not exceeding 3 times the weight of polymer and not exceeding the weight of propellant.

30. A process according to claim 28 wherein the polymer is polyisbutyl methacrylate.

31. A process according to claim 28 wherein the additive is in solution in the propellant.

32. A process according to claim 28 wherein the additive is dispersed in the propellant.

33. A process according to claim 28 wherein the additive is in a separate liquid phase that is itself dispersed in the propellant.

34. A process according to claim 28 wherein the separate liquid phase is an aqueous phase.

35. A process for forming and using a foamed structure, which comprises expelling from a closed container a propellant composition comprising a liquid propellant phase comprising a solution containing a film-forming synthetic polymer selected from the group consisting of thermoplastic resins, thermosetting resins in a thermplastic propellantsoluble state, and crosslinkable resins in a thermoplastic propellantsoluble state in an amount within the range from about 10 to about 60% by weight of the composition and a liquid propellant boiling below 45° F., at atmospheric pressure and retained in the composition in the liquid phase at a superatmospheric pressure, the propellant being inert to the synthetic polymer and the additive, and being in a sufficient amount within the range from about 20 to about 70% by weight of the composition to form upon rapid volatilization of the propellant at atmospheric temperature and pressure a coherent voluminous foamed structure containing open and/or closed cells; and the composition also comprising an additive which is in an amount the range from about 5 to about 700% by weight of the polymer in excess of the amount soluble in the polymer in the absence of the propellant, and which is deposited in the cells or cells and walls of the structure when the propellant volatilizes, and which can be removed in liquid form from the cells of the structure by compression of the structure or by leaching with a solvent in which the additive is soluble but in which the foamed structure is insoluble, any organic liquid present which is a solvent for the polymer and boils at or above 45° f., at atmospheric pressure and which is in the propellant phase being in an amount from about zero up to about three times the amount of polymer present in the propellant phase; volatilizing the propellant at atmospheric temperature and pressure to foam the synthetic polymer and form a foamed structure containing the additive in the cells or pores thereof, and then removing the additive in liquid form from the resulting structure.

36. A process according to claim 35, in which the propellant composition comprises a solid additive which is dispersed or dissolved in the propellant and which is deposited in the cells or cells and walls of the structure when the propellant volatilizes, and which can be removed from the cells of the sturce by leaching with a solvent in which the additive is soluble but in which the foamed structure is insoluble.

37. A process according to claim 36, in which the additive is a solid detergent.

* * * * *

UNITED STATES PATENT OFFICE
CERTIFICATE OF CORRECTION

Patent No. 3,912,667    Dated October 14, 1975

Inventor(s) Joseph George Spitzer et al.    Page 1 of 7

It is certified that error appears in the above-identified patent and that said Letters Patent are hereby corrected as shown below:

| | | |
|---|---|---|
| Page 1 [76] | : | "Cone" should be -- Cove -- |
| Column 1, line 32 | : | "Pat" should be --Pats-- |
| Column 1, line 57 | : | "nso" should be --so-- |
| Column 1, line 67 | : | "Pat" should be --Pats-- |
| Column 3, line 10 | : | "straucture" should be --structure-- |
| Column 3, line 12 | : | after "have" please delete --;-- |
| Column 4, line 26 | : | "resi" should be --resin-- |
| Column 4, line 42 | : | "it" should be --if-- |
| Column 5, line 46 | : | "nay" should be --any-- |
| Column 5, line 54 | : | before "(Propellant 114)" please insert -- (Propellant 12), 1,1-dichloro-1,1,2,2-tetrafluoroethane -- |

FORM PO-1050 (10-69)

UNITED STATES PATENT OFFICE
CERTIFICATE OF CORRECTION

Patent No. 3,912,667  Dated October 14, 1975

Inventor(s) Joseph George Spitzer et al   Page 2 of 7

It is certified that error appears in the above-identified patent and that said Letters Patent are hereby corrected as shown below:

| | | |
|---|---|---|
| Column 5, line 67 | : | "tend" should be --tends-- |
| Column 7, line 42 | : | "Liquid" should be --Liquids-- |
| Column 8, line 31 | : | "fored" should be --formed-- |
| Column 8, line 40 | : | "dispered" should be --dispersed-- |
| Column 8, line 53 | : | "structue" should be --structure-- |
| Column 8, line 53 | : | "emullsion" should be --emulsion-- |
| Column 8, line 59 | : | "hyrrophilic" should be --hydrophilic-- |
| Column 8, line 62 | : | "thepropellant" should be -- the propellant-- |
| Column 9, line 17 | : | "joleate" should be --oleate-- |
| Column 9, line 34 | : | "it" should be --It-- |
| Column 9, line 51 | : | "voltatilized" should be --volatilized-- |
| Column 9, line 54 | : | "forned " should be --formed-- |
| Column 10, line 13 | : | "anti-dnadruff" should be --anti-dandruff-- |
| Column 10, line 14 | : | "llcquers" should be --lacquers-- |

UNITED STATES PATENT OFFICE
CERTIFICATE OF CORRECTION

Patent No. 3,912,667      Dated October 14, 1975

Inventor(s) Joseph George Spitzer et al     Page 3 of 7

It is certified that error appears in the above-identified patent and that said Letters Patent are hereby corrected as shown below:

| | | |
|---|---|---|
| Column 10, line 25 | : | after "application" please delete -- such as agents of all types, and antibiotics, for external application, -- |
| Column 10, line 27 | : | "ectal" should be --rectal-- |
| Column 10, line 40 | : | "sullaoxazole" should be --sulfaoxazole-- |
| Column 10, line 55 | : | "oleandomyein" should be --oleandomycin-- |
| Column 10, line 61 | : | "fluroocortison" should be --fluorocortisone-- |
| Column 10, line 62 | : | "flurorohydrocortisone" should be --fluorohyrdrocortisone-- |
| Column 10, line 64 | : | "ethyl119" should be --ethyl-19 -- |
| Column 11, line 5 | : | "o f" should be --of-- |
| Column 11, line 6 | : | "for" should be --from-- |
| Column 11, line 20 | : | "solfonates" should be --sulfonates-- |
| Column 11, line 23 | : | "molles" should be --moles-- |
| Column 11, line 28 | : | "llactate" should be --lactate-- |
| Column 11, line 28 | : | "llac" should be -- lac -- |

UNITED STATES PATENT OFFICE
CERTIFICATE OF CORRECTION

Patent No. 3,912,667　　　　　　　　　　Dated October 14, 1975

Inventor(s) Joseph George Spitzer et al　　　Page 4 of 7

It is certified that error appears in the above-identified patent and that said Letters Patent are hereby corrected as shown below:

| | |
|---|---|
| Column 11, line 44 | : "tfhe" should be --the-- |
| Column 11, line 45 | : "unsaturted" should be --unsaturated-- |
| Column 11, line 45 | : "frfo" should be --from-- |
| Column 11, line 46 | : "26carbon" should be -- 26 carbon-- |
| Column 11, line 49 | : "hehenic" should be --behenic-- |
| Column 11, line 49 | : "margarie" should be --margaric-- |
| Column 11, line 66 | : "prupose" should be --purpose-- |
| Column 12, line 67 | : "appliection" should be -- application-- |
| Column 13, line 4 | : "temperatue" should be --temperature-- |
| Column 13, line 6 | : "structue" should be --structure-- |
| Column 13, line 13 | : "magnesiuum" should be --magnesium-- |
| Column 13, line 32 | : "instaneously" should be --instantaneously-- |
| Column 13, line 36 | : "becuase" should be --because-- |
| Column 13, line 45 | : "structuer" should be --structure-- |
| Column 14, line 26 | : "structuer" should be --structure-- |

UNITED STATES PATENT OFFICE
CERTIFICATE OF CORRECTION

Patent No. 3,912,667                Dated October 14, 1975

Inventor(s) Joseph George Spitzer et al     Page 5 of 7

It is certified that error appears in the above-identified patent and that said Letters Patent are hereby corrected as shown below:

| | |
|---|---|
| Column 14, line 30 | : "it" should be --It-- |
| Column 14, line 30 | : "evauluatees" should be --evaluates-- |
| Column 14, line 31 | : "tendency" should be --tendency-- |
| Column 14, line 40 | : "onthe" should be --on the-- |
| Column 14, line 47 | : "fr" should be --for-- |
| Column 14, line 61 | : "approiximately" should be --approximately-- |
| Column 14, line 63 | : "products" should be -- Products-- |
| Column 15, line 12 | : "dicharge" should be --discharge-- |
| Column 16, line 5 | : "visocosity" should be --viscosity-- |
| Column 16, line 6 | : "continer" should be --container-- |
| Column 16, line 10 | : "throughthe" should be --through the-- |
| Column 16, line 13 | : "Theproportions" should be --The proportions -- |
| Column 16, line 14 | : "solutin" should be --solution-- |
| Column 16, line 27 | : "whenthe" should be --when the-- |
| Column 17, line 67 | : please delete "n" after abrasive |

UNITED STATES PATENT OFFICE
CERTIFICATE OF CORRECTION

Patent No. 3,912,667  Dated October 14, 1975

Inventor(s) Joseph George Spitzer et al  Page 6 of 7

It is certified that error appears in the above-identified patent and that said Letters Patent are hereby corrected as shown below:

Column 24, column under (Example) "47", last line: "13" should be deleted and be put in column under (Example) "48", last line

| Examples | Parts by Weight | | | |
|---|---|---|---|---|
| | 45 | 46 | 47 | 48 |
| Elvacite 2044 (about 300,000 molecular weight) | 34 | 31.5 | — | — |
| Elvacite 2045 (about 350,000 molecular weight) | — | — | 32.5 | — |
| Elvacite 2046 (about 350,000 molecular weight) | — | — | — | 33 |
| Silicone L522 | 2 | 0.5 | 1.3 | — |
| Peneteck 38/40 | 22 | 0 | 16 | 16 |
| Drakeol 15 | — | 11 | — | — |
| Deobase | — | 5 | 5.4 | 5.2 |
| GE-SF 96-1000 | — | 5 | 2.5 | 2.6 |
| Carnauba wax | — | 1 | 1.6 | 1.6 |
| Ceresin wax (150°F.) | — | 1 | — | — |
| Talc | 17 | 16 | — | — |
| Freon 114 | 13.6 | 8 | 21.3 | 21.3 |
| Genetron 142B | 11.4 | 22 | 11 | 7.3 |
| Freon 12 | — | — | 8 13 | | should be

| Examples | Parts by Weight | | | |
|---|---|---|---|---|
| | 45 | 46 | 47 | 48 |
| Elvacite 2044 (about 300,000 molecular weight) | 34 | 31.5 | — | — |
| Elvacite 2045 (about 350,000 molecular weight) | — | — | 32.5 | — |
| Elvacite 2046 (about 350,000 molecular weight) | — | — | — | 33 |
| Silicone L522 | 2 | 0.5 | 1.3 | — |
| Peneteck 38/40 | 22 | 0 | 16 | 16 |
| Drakeol 15 | — | 11 | — | — |
| Deobase | — | 5 | 5.4 | 5.2 |
| GE-SF 96-1000 | — | 5 | 2.5 | 2.6 |
| Carnauba wax | — | 1 | 1.6 | 1.6 |
| Ceresin wax (150°F.) | — | 1 | — | — |
| Talc | 17 | 16 | — | — |
| Freon 114 | 13.6 | 8 | 21.3 | 21.3 |
| Genetron 142B | 11.4 | 22 | 11 | 7.3 |
| Freon 12 | — | — | 8 | 13 |

UNITED STATES PATENT OFFICE
CERTIFICATE OF CORRECTION

Patent No. 3,912,667  Dated October 14, 1975

Inventor(s) Joseph George Spitzer et al          Page 7 of 7

It is certified that error appears in the above-identified patent and that said Letters Patent are hereby corrected as shown below:

Column 25, line 23           : "Peneteck 388/40" should be --Peneteck 38/40--

Column 25, Examples 55 & 56 : Delete last line of Table, bottom line of column 25

Column 27, line 61 Claim 13 : "dichlor" should be --dichloro--

Column 28, line 17, Claim 16 : "snythetic" should be --synthetic--

Column 28, line 49, Claim 23 : "the cells" should be -- the cells--

Column 29, line 5, claim 29 : "dissolve" should be --dissolved--

Column 29, line 27, claim 35 : "thermplastic" should be --thermoplastic--

Column 30, line 5, claim 35 : please insert after "range" --within--

Column 30, line 5, claim 35 : "45°f" should be --45°F--

Column 30, line 29, claim 36 : "sturce" should be --structure--

Signed and Sealed this

Twentieth Day of July 1976

[SEAL]

Attest:

RUTH C. MASON
*Attesting Officer*

C. MARSHALL DANN
*Commissioner of Patents and Trademarks*